March 4, 1952 H. W. BROWN 2,587,692
POWDER MEASURING DEVICE WITH MICROMETER ADJUSTMENT
Filed Jan. 13, 1950
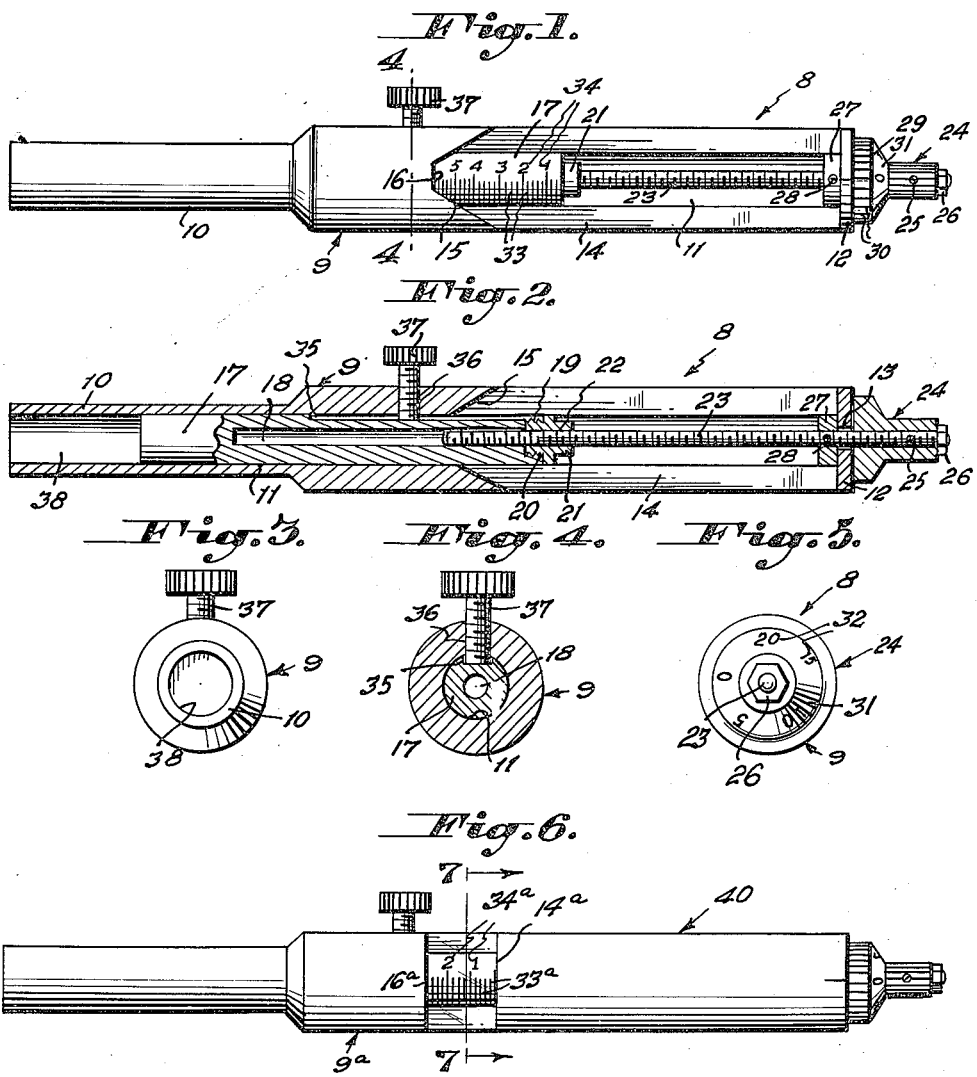
Inventor
Horace W. Brown
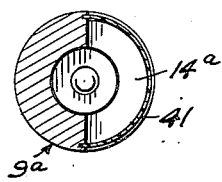
Attorney Patented Mar. 4, 1952

2,587,692

UNITED STATES PATENT OFFICE 2,587,692

POWDER MEASURING DEVICE WITH MICROMETER ADJUSTMENT

Horace W. Brown, West Newbury, Mass.

Application January 13, 1950, Serial No. 138,430

5 Claims. (Cl. 73—429)

This invention relates to a measuring device of extremely simple construction for use in accurately measuring powder charges for firearm cartridges and which can be quickly and easily set for accurately measuring any desired charge of any particular type of powder and by which a desired setting can be quickly reproduced or duplicated.

More particularly, it is an aim of the present invention to provide a device including a movable plunger having a linear scale capable of being accurately adjusted to one-thousandth of an inch for measuring powder readily to one-tenth of a grain and which is intended to be utilized with a suitable chart for different types of powder due to the fact that modern powders are loaded by weight and the number of grains or tenths of grains of a given weight vary for different powders so that a chart is required to convert the weight of any specific powder to the linear measure associated with the powder measuring device.

More particularly, it is an aim of the present invention to provide a device which will eliminate the slow and tedious process of weighing charges and by which a powder measuring chamber of the device may be varied in size accurately to accommodate any particular powder charge of any type of powder and the desired setting readily reduced or duplicated when required.

Various other objects and advantages of the invention will hereinafter become more fully apparent from the following description of the drawing, illustrating presently preferred embodiments thereof, and wherein:

Figure 1 is a plan view of one embodiment of the measuring device;

Figure 2 is a longitudinal central sectional view thereof;

Figure 3 is an end elevational view looking from left to right of Figure 1;

Figure 4 is a cross sectional view taken substantially along a plane as indicated by the line 4—4 of Figure 1;

Figure 5 is an end elevational view looking from right to left of Figure 1;

Figure 6 is a plan view similar to Figure 1 but of a slightly different form of the device, and Figure 7 is a cross sectional view thereof taken substantially along a plane as indicated by the line 7—7 of Figure 6.

Referring more specifically to the drawing and first with reference to the embodiment of the invention as illustrated in Figures 1 to 5, the powder measuring device in its entirety is designated generally 8 and includes an elongated body member, designated generally 9 one end of which is preferably externally restricted as seen at 10. The body member 9 has a bore of circular cross section and of uniform diameter as seen at 11 which extends from its restricted end to adjacent its opposite end and said last mentioned end forms an end wall 12 having a restricted opening 13 which registers with and is disposed axially of the bore 11. The enlarged body portion is cut away from the end wall 12 to a point adjacent to the restricted portion 10 to provide an opening 14 having a restricted end 15, located remote to the wall 12 and including a transverse portion 16 constituting a sight line, as will hereinafter become apparent. An elongated plunger 17 of circular external cross section is reciprocally disposed in the bore 11 and is sized for relatively close fitting engagement therewith.

The plunger 17 has an elongated recess or bore 18 extending from near one end thereof and which opens outwardly of the end of the plunger which is located adjacent the end wall 12. The recess or bore 18 is enlarged and internally threaded as seen at 19 at its open end to receive an externally threaded restricted end 20 of a sleeve 21 which is provided with a threaded bore 22 of a diameter slightly less than the diameter of the bore or recess 18. The sleeve 21 projects a short distance beyond the inner end of the plunger 17 and toward the end wall 12.

A feed screw 23 threadedly engages the threaded bore 22 and extends from the sleeve 21 through the opening 13. A knob, designated generally 24 is detachably secured on the exposed end of the feed screw 23 preferably by a setscrew 25 and by a nut 26 which engages said feed screw end. The knob 24 is disposed outwardly of the end wall 12 and a collar or stop 27 is detachably secured to the feed screw 23 by a setscrew 28 on the inner side of the end wall 12.

The knob 24 has an enlarged peripheral portion 29 on which is suitably inscribed twenty-five graduation lines 30 which are equally spaced therearound and adjacent thereto, the knob 24 has a frusto-conical portion 31 containing the indicia 32, as best seen in Figure 5, designating each fifth graduation 30. The longitudinal portion of the plunger 17 which is visible through the cutout or opening 14 is provided with longitudinally spaced graduations 33 and the indicia 34 comprising consecutive numerals beginning with zero and with a numeral applied to each fourth graduation.

The plunger 17 is provided with a longitudinally extending groove 35 and the body member 9 has a radial threaded bore 36 which opens into the bore 11 for receiving a setscrew 37, the inner end of which is adapted to be disposed to slidably engage in the groove 35 to permit the plunger 17 to reciprocate in the bore 11 but to prevent it from rotating therein.

The portion of the bore 11 between its open end and the adjacent end of the plunger 17 constitutes the powder measuring chamber 38 of the measuring device 8, the size of which chamber may be varied by turning the knob 24 to move the plunger 17 toward or away from the open end of the bore 11 for reducing or increasing, respectively, the size of the chamber 38. By turning the knob 24 clockwise as seen in Figure 5 the plunger 17 is drawn toward the end wall 12 to increase the size of the chamber 38 and by turning the knob counterclockwise, the plunger is advanced toward the open end of the bore 11 for restricting the chamber 38. The size of the chamber 38 is read in terms of inches and fractions thereof by means of the graduations 33 and 30 and the indicia 34 and 32, respectively, associated therewith. The spacing between the adjacent graduations 33 each represent .025 inch and the spacing between the numbered graduations 33, designated by the numerals 34 represent .100 inch the zeros being omitted from the numerals 34. One revolution of the knob 24 and feed screw 23 moves the plunger .025 inch or the distance between two adjacent graduations 33 so that the twenty-five graduations 30 on the periphery 29 each represent .001 inch. The transverse edge 16 is employed with the graduations 33 as a marking or sight line and it will be seen that the plunger 17 is set in Figure 1 to provide a chamber 38 having a length of .600" since the zero graduation 30 is registering with the zero sight line 39 of the wall 20. Accordingly, with a chart, not shown, converting different types of firearm powders from weights and grains to a linear measure, the device 8 may be readily set for measuring a charge of any particular powder and is capable of being adjusted for measuring powder charges to more accurately than one-tenth of a grain. Likewise, after the device 8 has been set if it is desired to measure a number of powder charges the setscrew 37 may be tightened to additionally function for locking the device at a predetermined setting and it will be readily apparent that any prior setting may be readily duplicated quickly and easily, thus providing a powder measuring device eliminating the use of a scale and the slow and tedious process of weighing powder charges and which will greatly facilitate the accurate measuring of powder charges.

Figures 6 and 7 illustrate another form of the powder measuring device designated generally 40 and which is identical with the powder measuring device 8 except that the cutout or opening 14 is omitted and in lieu thereof the body 9a is provided with a relatively small semi-circular opening 14a, the wall or edge 16a of which is disposed transversely of the longitudinal axis of the body 9 and functions in the same manner and for the same purpose as the edge 16. The semi-circular opening 14a is closed by a transparent pane or cover 41 which may be suitably anchored at its ends and edges in the body 9a and through which the graduations 33a and indicia 34a are clearly visible. Accordingly, the measuring device 40 is completely enclosed except for the powder measuring chamber, not shown, as a result the feed screw and other parts located within the bore of the body are completely protected from dirt and other foreign matter. As the operation and use of the measuring device 40 is identical with that of the measuring device 8, a further description thereof is considered unnecessary.

Various other modifications and changes are likewise contemplated and may obviously be resorted to, without departing from the spirit or scope of the invention as hereinafter defined by the appended claims.

I claim as my invention:

1. A powder charge measuring device comprising an elongated body member having a bore extending longitudinally from adjacent one end thereof and opening outwardly of the opposite end, said body member having an end wall at the first mentioned end of the bore provided with a restricted opening registering with said bore, a plunger reciprocally disposed in said bore, means for non-rotatably retaining the plunger relatively to the bore, feed screw means extending loosely through the end wall opening and threadedly connected to said plunger for reciprocating the plunger in the bore, said feed screw means including a thumb knob disposed beyond said end wall of the body member for manually revolving the feed screw means, a portion of the bore, disposed between the plunger and its open end, defining a powder charge measuring chamber, said plunger having longitudinally spaced graduations and indicia thereon constituting a linear measure, said thumb knob having circumferentially spaced graduations and indicia constituting a vernier scale for use with the linear measure of the plunger, and said body member having an opening therein through which the linear measure of the plunger is visible for accurately adjusting the plunger for accurately varying the size of the powder charge measuring chamber.

2. A powder charge measuring device as in claim 1, and a transparent pane for closing said last mentioned opening forming a window through which a portion of the plunger is visible and combining with the body to completely enclose the parts contained within said body between its end wall and the powder measuring chamber.

3. A powder charge measuring device as in claim 1, said means for non-rotatably mounting the plunger in the bore comprising a set-screw threaded radially into said body, said plunger having a longitudinally extending groove for receiving a portion of the set-screw for non-rotatably retaining the plunger in the bore, said set-screw being manually adjustable for detachably clamping the plunger to the body for maintaining the plunger in a preset position.

4. A powder charge measuring device as in claim 1, said plunger having a longitudinally extending recess opening outwardly of an end thereof and toward said end wall, said feed screw means including a feed screw loosely receivable in the plunger recess, an internally threaded sleeve detachably connected to the end of the plunger located adjacent said end wall and through which said feed screw threadedly extends.

5. A measuring device comprising an elongated body member having a bore extending longitudinally from adjacent one end thereof and opening outwardly of its opposite end, said body member having an end wall at the first mentioned end thereof provided with a restricted opening registering with the bore, a plunger slidably disposed in the bore, means non-rotatably retaining the plunger relatively to the bore, manually actuated feed screw means extending loosely through the restricted opening and rotatably and non-slidably disposed in said end wall, said feed screw means being threadedly connected to the plunger for reciprocating the plunger in the bore when the feed screw means is revolved, and the portion of the bore, disposed between its open end and said plunger, defining a variable measuring chamber.

HORACE W. BROWN.

REFERENCES CITED

The following references are of record in the file of this patent:

UNITED STATES PATENTS

| Number | Name | Date |
|---|---|---|
| 1,433,075 | Gottlieb | Oct. 24, 1922 |
| 2,521,343 | Chadwick | Sept. 5, 1950 |

FOREIGN PATENTS

| Number | Country | Date |
|---|---|---|
| 638,349 | Germany | Nov. 13, 1936 |